July 1, 1969     MAKOTO SHIMIZU ET AL     3,452,968

ROASTING PROCESS OF FINE ORE AND A DEVICE THEREFOR

Filed Oct. 12, 1967

INVENTOR
SHIMIZU ET AL
BY
Nolte & Nolte
ATTORNEYS

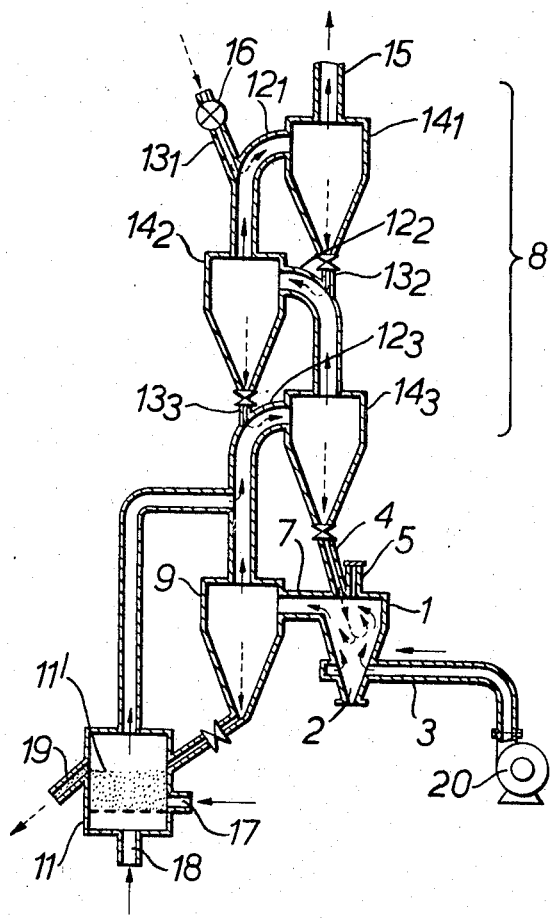
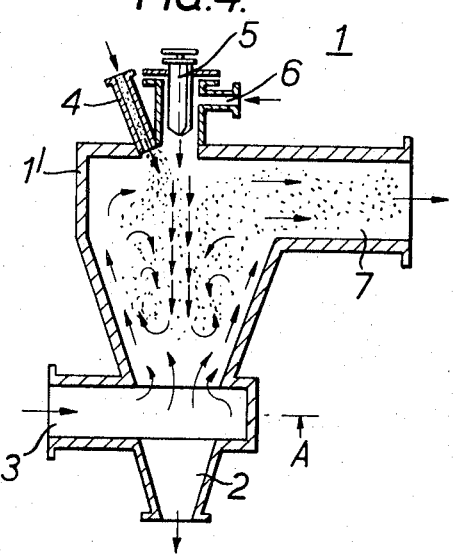
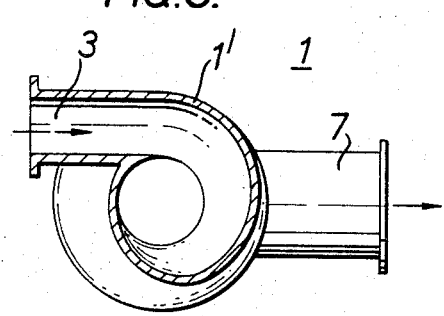

United States Patent Office 3,452,968
Patented July 1, 1969

3,452,968
ROASTING PROCESS OF FINE ORE
AND A DEVICE THEREFOR
Makoto Shimizu, Tokyo-to, Masao Seki, Yokohama-shi, and Shinji Nishizaki, Tokyo-to, Japan, assignors to Ishikawajima-Harima Jukogyo Kabushiki Kaisha, Tokyo-to, Japan, a Japanese company
Filed Oct. 12, 1967, Ser. No. 674,797
Claims priority, application Japan, Oct. 12, 1966, 41/66,620; July 8, 1967, 42/43,924
Int. Cl. F27d *3/16;* F27b *9/14;* F26b *17/00*
U.S. Cl. 263—21                                     5 Claims

ABSTRACT OF THE DISCLOSURE

A roasting process of fine ore and a device therefor wherein the fine ore and the fuel are ejected into the rotatory flow of the gas for combustion to form a violently diffusing turbulent flow of the layer of mixture and the phenomenon of combustion and the roasting reaction are caused thereby in the said violently diffusing turbulent flow of the layer of mixture.

---

Figure 1:
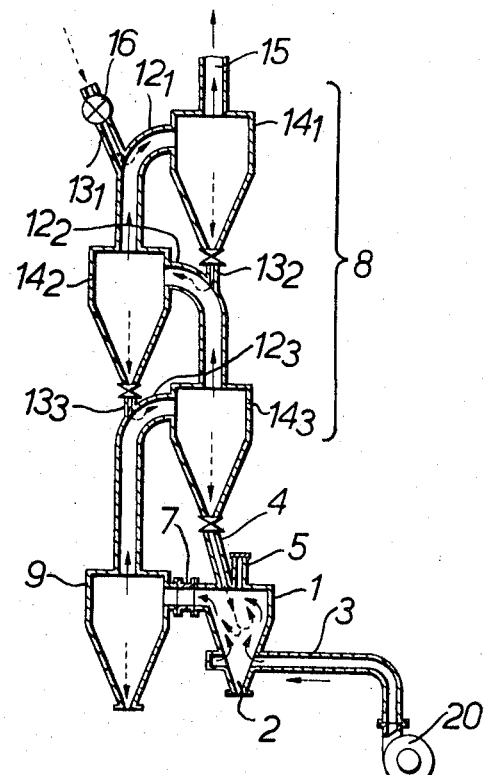

The present invention relates to a roasting process of fine ore and a device therefor.

Conventionally, a rotary kiln has often been used as the furnace for heating and roasting of the fine ore and, in recent years, fluidized bed furnace, or gas-solid suspension roasting furnace such as a suspension preheater has been proposed. However, since the rotary kiln has a very small heat transfer efficiency and a low volume efficiency, the rotary kiln has the disadvantages that not only the furnace must be constructed large in size, and thus a high cost of equipment is caused, in consequence but also the heat insulation can not be completely attained and much heat radiation is caused by rotating the furnace and thus a high fuel expense is inevitable.

The fluidized bed furnace also has the disadvantages:

In the fluidized bed furnace, the gas velocity in the furnace is determined by the diameter of the fine ore, while the required quantity of gas is determined by the quantity of heat for the roasting of the said fine ore and, therefore, when the diameter of the fine ore is small, the gas velocity in the furnace must be kept small, this fact necessitates the diameter of a furnace to be made large and, consequently, the cost of equipment must be increased.

Further, although, in the conventional suspension roasting furnace the high-temperature hot blast is supplied into the furnace to heat the fine ore, the blast almost as hot as the theoretical combustion gas temperature can not be supplied because the heat resisting temperature of the material, of which the furnace is constructed, is limited, and the temperature of the blast is limited to 1200–1600° C. and thus the combustion proceeds at a large air ratio and the quantity of the treating gas increases and large auxiliary devices, are required which causes the disadvantage that the cost of equipment increases.

The present invention relates to a roasting process of fine ore and a device therefor, which can eliminate the above described various disadvantages peculiar to the process of heating and roasting of the fine ore adopting said rotary kiln, fluidized bed furnace or suspension roasting furnace, characterized in that a violently diffusing turbulent flow of the layer of mixture is formed in the furnace by supplying the rotating air current from the lower part of the furnace, and supplying the fuel and the fine ore from the upper part of the furnace, the heating and reaction of the fine ore being finished simultaneously with combustion and the heat gained from the combustion being immediately absorbed by the fine ore. By means of the process of the present invention, the temperature within the furnace can be kept lower than the theoretical combustion temperature. Hence the disadvantages of the conventional process can be eliminated. The present invention relates to a roasting process of fine ore which can compensate for defect of the air current roasting process such as the impossibility of the operation owing to the fact that unreacted substance remains on account of short residence time and that the said remainder fuses and deposits, by combining the above mentioned air current roasting system with a furnace, in which ore resides for long time, such as a rotary kiln or a fluidized bed furnace, characterized in that the gas from the lower part of the chamber climbs up, revolving in the said chamber and the fine ore and the fuel are supplied from the upper part of the chamber so that a violently diffusing turbulent flow of the layer of mixture is generated around the center of the chamber that after the fine ore is heated and its reaction is over simultaneously with combustion, the fine ore and the gas are separated by means of a separating apparatus, and that the separated fine ore is supplied to and heated in a roasting furnace which is capable of a longer period of heating in comparison with the suspension roasting furnace. Explanation will be made of the process of the embodiments of the present invention with reference to figures.

Figure 2:
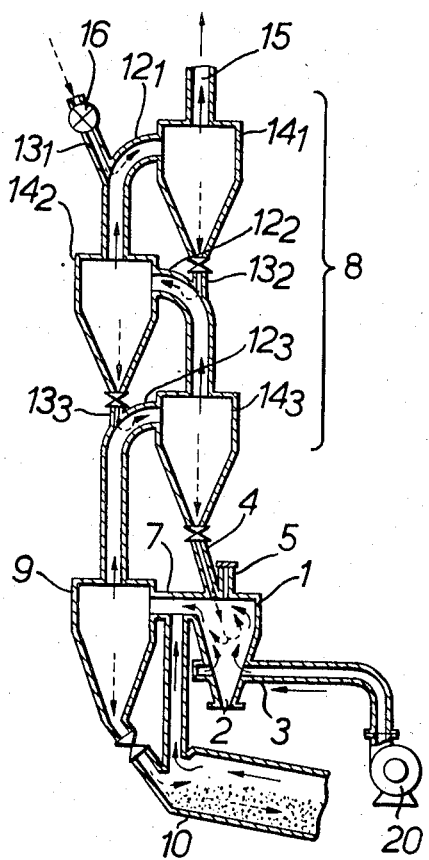

FIGS. 1, 2 and 3 are explanatory figures showing the summary of the structure of the device used for the practical embodiment of the roasting process of the present invention, FIG. 4 is the figure of an example of the structure of the air current roasting furnace adopted for the fine ore roasting process of the present invention, and FIG. 5 is a section along the A—A line in FIG. 4.

An example of the air current roasting furnace adopted in the roasting process of the present invention is shown in FIGS. 4 and 5. The air current roasting furnace 1 shown in FIGS. 4 and 5 is provided, in the lower part of the furnace body 1', with an outlet for masses 2 for exhausting granular substance or broken pieces of bricks in the fine ore of the raw material or the roasted fine ore and an air-sending pipe 3 engaged volutely or tangentially with the furnace body 1' for supplying the gas, revolving it into the furnace.

On the ceiling part of the furnace body 1', a raw-material-supplying pipe 4 placed as near to the central axis of the furnace as possible and a burner for supplying the fuel 5 are provided and further a primary air pipe 6 is set up, if necessary, so as to control the state of combustion. Also, on the upper part of the side wall of the furnace body 1', a duct 7 is installed for exhausting out of the furnace the gas and the fine ore floating in the gas. The said duct 7 may be placed tangentially or volutely with respect to the center of the axis of the furnace if it is desired to increase the revolving effect of the air current within the furnace.

During the operation, that volume of the gas at which the velocity of the gas in the furnace surpasses the velocity of the terminal velocity of the fine ore is supplied from the air-sending pipe 3 at the lower part of the furnace. The gas goes up in whirling flow in the furnace along its wall. By that flow, the low pressure zone is formed in the central part of the furnace and such adverse flow phenomenon is generated that a part of the gas goes down. The fuel ejected from the burner 5 in the upper part of the furnace and the fine ore supplied from raw-material-supplying pipe 4 flow down to the said low pressure zone in the central part of the furnace, where the combustion, and the heating of the fine ore and its reaction immediately takes place. The heated fine ore floats in the air current, and is guided to the dust collector through the exhaust duct 7 installed on the upper side wall of the furnace and is taken out, after being separated from the gas.

FIGS. 1, 2 and 3 show the structure of the device in which the roasting process according to the present invention is practiced, comprising an air current roasting furnace 1, a preheater 8, a separating cyclone 9, a rotary kiln 10, a fluidized bed roasting furnace 11, etc. shown in FIGS. 4 and 5.

The preheater 8 is composed of cyclones $14_1$–$14_3$ connected together successively by the passages for the ascending of the burnt gas and the fine ore $12_1$–$12_3$, and the chute for the descending of the fine ore $13_1$–$13_3$, and a gas-exhaust passage 15 is provided in the upper part of the said cyclone $14_1$ and a feeder 16 is provided in the upper end part of the chute $13_1$.

Further, the air current roasting furnace 1 is connected with the cyclone $14_3$ through the raw-material-supplying pipe 4, and the separation cyclone 9 connected with the said air current roasting furnace 1 by the duct 7 is in turn connected with the preheater 8 through the passage $12_3$.

In the device shown in FIG. 1, when the high-velocity gas for combustion whose pressure is hightened by the blower 20 is sent into the rotary chamber formed in the attached part of the air-sending pipe 3 and the furnace body 1', a violently diffusing turbulent flow of the gas for combustion is formed in the roasting furnace 1. Then, the fuel, being ejected from the burner 5 and lit, become high-temperature combustion-gas flow, go out from the exhaust duct 7 and exhausted out from the exhaust-gas passage 15 through all cyclones 9 and $14_1$–$14_3$ and passages $12_3$–$12_1$.

At that time, the fine ore, after being supplied from the feeder 16 through the chute $13_1$, may descend, exchanging heat with the high-temperature exhaust gas and being preheated through chutes $13_1$–$13_3$, passages $12_1$–$12_3$ and cyclones $14_1$–$14_3$ and then may be supplied into the roasting furnace 1 from the raw-material supplying pipe 4. Since, by keeping supplying the fuel and the gas for combustion in the amount increased in proportion to the heat capacity required for roasting the fine ore, the combustion phenomenon of fuel and the roasting phenomenon of fine ore take place simultaneously and rapidly within the violently diffusing turbulent flow of the layer of mixture in the furnace, the fine ore is roasted in a short period of time of stay in the furnace and flows out from the duct 7 into the cyclone 9, floating in the burnt gas. The roasted fine ore of smaller diameter separated from the burnt gas in the said cyclone 9 is exhausted from the outlet 22, while the roasted fine ore of larger diameter which does not float in the burnt gas is exhausted from the outlet 2.

Thus, the above described defects of above described conventional fluidized bed roasting process and air current roasting process can be easily and completely eliminated with a simple device according to the process and the device of the present invention.

The device in FIG. 2 shows an example of a cement clinker burning device where $CaCO_3$ is temporarily burnt in the air current roasting furnace 1 and the fine ore after temporal burning is burnt at a high temperature in the rotary kiln 10, wherein the said device has the structure that the fine ore flows into the said kiln 10 from the separation cyclone 9 and also the hot gas, etc. is sent from the said kiln 10 into the duct 7.

If the raw material of cement is sent in from the feeder 16 through the chute $13_1$ and the gas of high velocity for combustion whose pressure is raised by a blower 20 is sent into the furnace body 1' through the air-sending pipe 3, then, the raw material of cement is supplied to the air current roasting furnace 1 after exchanging heat with the exhaust gas in the preheater 8 and being preheated to 700–800° C., and, in the air current roasting furnace 1 80–90% of fuel needed for the production of cement clinker is consumed to heat the fine ore to 800–900° C. and to decompose 99% or more of $CaCO_3$, and finally the product is sent to the separation cyclone 9.

The temporarily-burnt raw material of 800–900° C., separated in the separation cyclone 9 is heated to 1400° C. in the rotary kiln to become cement clinker. As is above described, the rotary kiln provided with the air current roasting furnace requires only one third to one fourth of the inner capacity in comparison with that of the rotary kiln that is not provided with the air current roasting furnace and the productivity of the kiln increases 3–4 times as high and so the cost of equipment can be saved.

FIG. 2 shows an example in which the reaction of the cement clinker generation which may fuse and deposit is made in the rotary kiln 10 and the temporary-combustion reaction which is free of fusion and deposition is made in the air current roasting furnace 1, while FIG. 3 shows and example of a roasting device for alumina in which the heating and desiccation of the fine ore which requires a large amount of heat capacity, is made in the air current roasting furnace 1, while the transformation which takes a long period of time is made in the fluidized bed roasting furnace 11.

The fluidized bed roasting furnace 11 of the device shown in FIG. 3 has a fuel-sending-in means 17, and air-sending-in means 18 and a roasted products-sending-out means 19, and is so structured that it receives the fine ore from the separation cyclone 9 and also sends out the hot gas, etc. into the passage $12_3$, the aluminium hydroxide supplied from the raw material feeder 16 being heated in the preheater 8 by the exhaust gas of the high temperature of the fluidized roasting furnace 11 and also being heated in the separation cyclone 9 to be desiccated by 30–50% of water and become about 400° C. of temperature and is supplied to the air current roasting furnace 1. The aluminium hydroxide is perfectly desiccated in the air current roasting furnace 1 and becomes $\gamma$-alumina and, further heated to 1200–1400° C. so that a part of the $\gamma$-alumina becomes $\alpha$-alumina, which is then separated in the separation cyclone 9 and supplied to the fluidized bed roasting furnace 11. The alumina forms a fluid layer 11' in the fluidized bed roasting furnace 11 by the air supplied from the lower part of the furnace and the said layer 11' is maintained at 1100–1300° C. by the fuel supplied to it. $\gamma$-alumina is kept in the fluid layer 11' at 1100–1300° C. and transformed into $\alpha$-alumina, which is then exhausted from the said fluid layer by the overflow to be sent into the cooler.

Since according to the roasting process explained in FIGS. 2 and 3, the gas from the lower part of the chamber ascends, rotating in the said chamber, the fine ore and the fuel being supplied from the upper part of the chamber into it, a violently diffusing turbulent flow of the layer of mixture being formed around the center of the chamber, the fine ore and the gas being separated from each other by means of the separating apparatus after the process of heating or reaction of the fine ore simultaneous with combustion, and the separated fine ore being supplied to the furnace and turned into roasted products, where the furnace is of the kind as can be heated for long such as a rotary kiln or a fluidized bed roasting furnace, such defects of the air current roasting process that the unreacted substance remains on account of the short time of reaction and the operation becomes impossible due to the fusion and deposition can be eliminated, and consequently such advantages as the improvement of productivity, and the decrease in the cost of equipment can be brought about.

What we claim is:

1. A roasting process of fine ore characterized in that a violently diffusing turbulent flow of the layer of mixture is formed in the central part of the chamber by making gas ascend, rotating in the chamber from its lower part and by supplying fuel and raw material of fine ore from the upper part of the chamber, to be heated and made react simultaneously with combustion, with the fine ore and the gas being separated from each other by means of a separating apparatus after the said heating and reaction, and the separated fine ore being supplied to a roasting furnace which is capable of heating it for long time and to a temperature higher than that at which the said reaction in suspended state has taken place.

2. A roasting process of fine ore characterized in that a violently diffusing turbulent flow of the layer of mixture is formed in the central part of the chamber by making gas ascend rotating in the chamber from its lower part and by supplying fuel and raw material fine ore from the upper part of the chamber, to make the said fine ore to be heated or react simultaneously with combustion, with the fine ore and the gas being separated from each other by means of a separating apparatus and the separated fine ore being supplied to be heated to a furnace which is capable of heating it for long time at a temperature equal to or lower than the temperature at which the said heating or reaction of the fine ore takes place.

3. A device for roasting fine ore characterized in that a fuel supplying inlet and a fine ore supplying inlet are installed at the central part of the ceiling of a vertical type roasting furnace of a cylindrical, conic or under-conic form, and a volute chamber for sending in the gas for combustion tangentially along its wall is installed at the lowest part of the furnace and at a right angle to the axis of the furnace so that sending in the gas for combustion and ejection of fine ore and fuel into the furnace can be performed simultaneously and that at the upper side wall of the furnace is installed an exhaust outlet for the roasted fine ore floating in the burnt gas.

4. A method of roasting fine ore including the following steps: supplying the gas for combustion by means of pressure into a vertical type roasting furnace, causing said gas to rotate upwardly about the interior wall portion thereof from the lower portion of said furnace, injecting fine ore and fuel simultaneously into said furnace from the central part thereof in a substantially vertically downward direction whereby a violently diffusing turbulent flow zone is formed around the center of said furnace wherein the combustion of the fuel and the roasting reaction of the fine ore proceed simultaneously and rapidly and whereby said gas acts as an insulator between the zone of turbulent combustion and the wall of the furnace.

5. A method of roasting fine ore including the following steps: supplying the gas for combustion at a temperature below the melting point of the fine ore by means of pressure into a vertical type roasting furnace, causing said gas to rotate upwardly about the interior wall portion thereof from the lower portion of said furnace, injecting fine ore and fuel preheated to over the ignition temperature of the fuel simultaneously into said furnace from the upper central part thereof in a substantially vertically downward direction whereby a violently diffusing turbulent flow zone is formed around the center of said furnace wherein the combustion of the fuel and the roasting reaction of the fine ore proceed simultaneously and rapidly and whereby said gas acts as an insulator between the zone of turbulent combustion and the wall of the furnace.

References Cited
UNITED STATES PATENTS 2,413,420   12/1946   Stephanoff _____ 34—10

JOHN J. CAMBY, *Primary Examiner.*

U.S. Cl. X.R.

34—10, 57; 263—32